United States Patent

Wang et al.

[11] Patent Number: 5,567,775
[45] Date of Patent: Oct. 22, 1996

[54] CRAFT CURING OF MODIFIED ISOMONOOLEFIN/PARA-ALKYLSTYRENE COPOLYMERS

[75] Inventors: Hsien C. Wang, Bellaire, Tex.; Irwin J. Gardner, Scotch Plains; James V. Fusco, Red Bank, both of N.J.

[73] Assignee: Exxon Chemical Patents Inc., Wilmington, Del.

[21] Appl. No.: 469,285

[22] Filed: Jun. 6, 1995

Related U.S. Application Data

[60] Continuation-in-part of Ser. No. 402,792, Mar. 15, 1995, which is a division of Ser. No. 181,713, Jan. 14, 1994, Pat. No. 5,430,118, which is a division of Ser. No. 880,922, May 11, 1992, abandoned, which is a division of Ser. No. 442,028, Nov. 27, 1989, Pat. No. 5,162,445.

[51] Int. Cl.$^6$ .................. C08F 255/10; C08F 257/02
[52] U.S. Cl. .................. 525/279; 525/285; 525/296; 525/301; 525/302; 525/305; 525/308; 525/309; 525/317; 525/319
[58] Field of Search .................. 525/279, 285, 525/296, 301, 302, 305, 308, 309, 312, 317, 319

[56] References Cited

U.S. PATENT DOCUMENTS

| | | | |
|---|---|---|---|
| 3,489,822 | 1/1970 | Witt et al. | 260/878 |
| 3,968,185 | 7/1976 | Baldwin et al. | 260/880 |
| 5,162,445 | 11/1992 | Powers et al. | 525/333.4 |
| 5,206,303 | 4/1993 | Tse | 525/319 |

OTHER PUBLICATIONS

Baldwin et al., "*Graft Curing with a Modified Butyl Rubber*", Chemistry of Crosslinked Polymers, 1977, pp. 273–287.

*Primary Examiner*—Vasu S. Jagannathan
*Attorney, Agent, or Firm*—Frank E. Reid; Myron B. Kurtzman

[57] ABSTRACT

This invention provides for curable and graft-cured polymer compositions prepared from a mixture comprising:

a) an elastomeric copolymer containing from about 0.01 up to about 10 mole % of Y ester groups randomly distributed along and pendant to the elastomeric polymer chain, said Y ester groups having the structure:

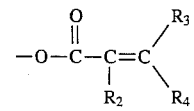

wherein $R_2$ and $R_3$ are independently selected from the group consisting of hydrogen and an alkyl group containing 1 to about 6 carbon atoms and $R_4$ is selected from the group consisting of hydrogen, an alkyl group containing from 1 to about 28 carbon atoms, an aryl group and an alkenyl group containing from 2 to about 28 carbon atoms; and b) at least one free radically polymerizable monomer. The invention also provides for a process for preparing graft-cured polymer compositions comprising forming the above recited mixture of (a) and (b) and subjecting said mixture to free radical polymerization conditions. The Y ester groups pendant to the elastomeric polymer chain, e.g. benzylic(meth)acrylic acid ester groups present in isobutylene/para-methystyrene interpolymer chains, are capable of participating in free radical initiated reactions with monofunctional or polyfunctional free radically polymerizable monomers to produce graft-crosslinked compositions having an unusual balance of physical properties. These compositions may be formed into shaped articles such as films, coatings, adhesive layers and moldings and subjected to free radical polymerization conditions to produce crosslinked shaped articles.

33 Claims, No Drawings

CRAFT CURING OF MODIFIED ISOMONOOLEFIN/PARA-ALKYLSTYRENE COPOLYMERS

This Application is a Continuation-in-Part Application of U.S. Ser. No. 08/402,792, filed Mar. 15, 1995; which is a Divisional application of U.S. Ser. No. 08/181,713, filed Jan. 14, 1994, now U.S. Pat. No. 5,430,118; which is a Divisional application of U.S. Ser. No. 07/880,922, filed May 11, 1992, now abandoned; which is a Divisional application of U.S. Ser. No. 07/442,028, filed Nov. 27, 1989, now U.S. Pat. No. 5,162,445.

BACKGROUND OF THE INVENTION

1. Field of the Invention

The present invention relates to graft cured compositions containing unsaturated ester-modified elastomeric polymers and their preparation through interactions with reactive monomers.

2. Description of Related Art

It is known in the prior art that certain elastomeric polymers containing conjugated diene unsaturation can be graft cured by reacting such polymers with one or more free radically polymerizable monomers in the presence of a free radical initiator. For example, U.S. Pat. No. 3,968,185 teaches that elastomers such as dehydrohalogenated copolymers of isobutylene and isoprene (butyl rubber) or elastomeric terpolymers of ethylene/propylene and a 5,6-dialkylene-2-norbornene can be crosslinked by reacting the elastomer with a free radically polymerizable monomer such as styrene in the presence of a free radical initiator. The presence of free internal diene unsaturation in such elastomers facilitates the addition of monomer chains onto the polymer backbone and the formation of complex polymer networks, some of which are grafted networks connecting different elastomeric molecules. These crosslinkable compositions can be formulated to provide cured products having an unusual balance of physical properties and are useful as coatings, adhesives and in molded and extruded mechanical, automotive and industrial goods.

Analogs of halogenated butyl rubber have been recently discovered which comprise the halogenation product of a random copolymer of a $C_4$ to $C_7$ isomonoolefin, e.g. isobutylene, and a para-alkylstyrene, e.g. para-methylstyrene, such as disclosed in U.S. Pat. No. 5,162,445. Although these materials are devoid of olefinic backbone unsaturation, the presence of a benzylic halogen, e.g. bromine, permits facile crosslinking or curing of the polymers using zinc oxide/stearic acid curing systems. In addition, functionalized versions of these copolymers may be prepared by nucleophilic substitution of the benzylic halogen present in the polymer molecules with a reagent reactive therewith to provide polymers containing amine, acid, ester, amide and the like functionality. Grafted polymers may also be prepared by a graft-onto reaction wherein the halogenated copolymer is reacted in solution with a polymeric nucleophile such as polystyryl lithium. These graft-onto reactions lead to the production of solvent soluble grafted copolymers but do not provide crosslinked grafted copolymers analogous to those described above.

SUMMARY OF THE INVENTION

This invention provides for curable polymer compositions comprising a mixture of:

a) an elastomeric copolymer containing from about 0.01 up to about 10 mole % of Y ester groups randomly distributed along and pendant to the elastomeric polymer chain, said Y ester groups represented by the structure:

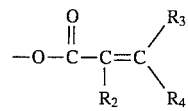

wherein $R_2$ and $R_3$ are independently selected from the group consisting of hydrogen and an alkyl group containing 1 to about 6 carbon atoms and $R_4$ is selected from the group consisting of hydrogen, an alkyl group containing from 1 to about 28 carbon atoms, an aryl group and an alkenyl group containing from 2 to about 28 carbon atoms; and b) at least one free radically polymerizable monomer.

The invention also provides for a process for preparing graft-cured polymer compositions comprising forming the above recited mixture of (a) and (b) and subjecting said mixture to free radical polymerization conditions.

The invention further provides a cured reaction product such as prepared by subjecting a mixture comprising components (a) and (b) set forth above to free radical polymerization conditions.

The Y ester groups pendant to the elastomeric polymer chain, e.g. benzylic (meth) acrylic acid ester groups present in isobutylene/para-methystyrene interpolymer chains, are capable of participating in free radical initiated reactions with monofunctional or polyfunctional free radically polymerizable monomers to produce graft-crosslinked compositions having an unusual balance of physical properties. These compositions may be subjected to free radical polymerization conditions to produce crosslinked (vulcanized) shaped articles such as films, coatings, adhesives and hot melt layers, as well as extruded or molded articles.

DETAILED DESCRIPTION OF THE INVENTION

The elastomeric polymer present as component (a) in the present invention may include any polymer or copolymer containing pendant functionality reactive with the corresponding acid or salt to yield Y ester groups pendant to the polymer chain. Such functionality includes hydroxyl and amine functionality such as present in hydroxy or amine containing polymers of polybutadiene, polyisoprene or EPDM elastomers, or halogen functionality such as present in copolymers of isobutylene with isoprene or para-alkylstyrene.

The invention is particularly applicable where component (a) comprises a benzylic ester-functionalized interpolymer of a $C_4$ to $C_7$ isomonoolefin and a para-alkylstyrene prepared by reacting a halogenated copolymer of a $C_4$ to $C_7$ isoolefin, as described below, with a nucleophilic reagent having the formula:

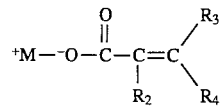

wherein M is hydrogen, a metal ion or an onium ion and $R_2$, $R_3$ and $R_1$ are as described above, under reaction conditions such that at least a portion, and preferably essentially all, of the benzylic halide atoms present in the halogenated copolymer structure are replaced with the corresponding ester group via a nucleophilic substitution reaction. In the formulas above, $R_2$ is preferably hydrogen or methyl, $R_3$ is preferably hydrogen and $R_4$ is preferably hydrogen or $C_3$ to $C_{12}$ alkenyl.

The halogenated $C_4$–$C_7$ isoolefin/para-alkylstyrene starting materials are the halogenation product of random copolymers of a $C_4$ to $C_7$ isoolefin, such as isobutylene, and a para-alkyl styrene comonomer, preferably para-methylstyrene containing at least about 80%, more preferably at least about 90% by weight of the para isomer, and wherein at least some of the alkyl substituent groups present in the styrene monomer units contain halogen. Preferred materials may be characterized as isobutylene interpolymers containing the following monomer units randomly spaced along the polymer chain:

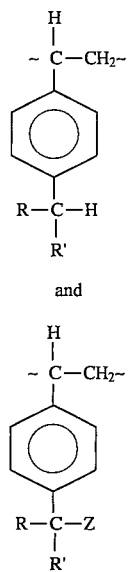

wherein R and R' are independently hydrogen, lower alkyl, preferably $C_1$ to $C_4$ alkyl, and X is bromine or chlorine, and wherein the interpolymer is otherwise substantially free of ring halogen or halogen in the polymer backbone chain. Preferably R and R' are each hydrogen. Up to about 60 mole % of the para-alkylstyrene present in the interpolymer structure may be the halogenated structure (2) above.

Most useful of such materials are elastomeric random copolymers of isobutylene and para-methylstyrene containing from about 0.5 to about 20 mole % para-methylstyrene wherein up to about 60 mole % of the methyl substituent groups present on the benzyl ring contain a bromine or chlorine atom, preferably a bromine atom. These copolymers have a substantially homogeneous compositional distribution such that at least 95% by weight of the polymer has a para-alkylstyrene content within 10% of the average para-alkylstyrene content of the polymer. They are also characterized by a narrow molecular weight distribution (Mw/Mn) of less than about 7, more preferably less than about 5.0, a preferred viscosity average molecular weight in the range of from about 300,000 up to about 2,000,000, and a preferred number average molecular weight in the range of from about 10,000, preferably 25,000 to about 1,000,000, as determined by Gel Permeation Chromatography.

The copolymers may be prepared by slurry polymerization of the monomer mixture using a Lewis Acid catalyst, followed by halogenation, preferably bromination, in solution in the presence of halogen and a radical initiator such as heat and/or light and/or a chemical initiator.

Preferred brominated copolymers generally contain from about 0.01 to about 10 mole % of bromomethyl groups, most of which is monobromomethyl, o with less than 0.05 mole % dibromomethyl substituents present in the copolymer. These copolymers, their method of preparation, their method of cure and graft or functionalized polymers derived therefrom are more particularly disclosed in U.S. Pat. No. 5,162,445, the complete disclosure of which is incorporated herein by reference. The acrylic and methacrylic ester functionalized derivatives of these copolymers are particularly disclosed in Examples 112 F-1 and 112 F-2 of this patent.

The nucleophilic substitution reaction described above is preferably conducted in solution using a solvent system which will dissolve the halogenated isoolefin/para-alkylstyrene copolymer and provide a solution or dispersion of both the polymer and nucleophilic reagent so as to achieve intimate contact between the benzylic halogen of the base polymer and the nucleophile. Suitable solvents include benzene, toluene, alkanes such as haptane, hexane, and cyclohexane and oxygen-containing solvents or solvent mixtures such as tetrahydrofuran or mixtures thereof with lower alcohols.

The reaction is preferably conducted under mild reaction conditions so as to avoid the formation of crosslinked or gelled products and minimize unwanted side reactions. Preferred reaction temperatures range from about 20° to 100° C. The formation of the desired reaction product is facilitated under mild reaction conditions by utilizing the onium salt of the nucleophilic agent as a reactant, i.e., the tetrabutyl ammonium salt.

Acids which can be used to form the nucleophile are those which contain ethylenic unsaturation conjugated with the carbonyl group, e.g., acrylic acid, methacrylic acid, sorbic acid, cinnamic acid and the like, as well as mixtures thereof. The resulting reaction product may be characterized as a random interpolymer comprising at least about 80 weight % of polymerized isoolefin containing 4 to 7 carbon atoms and from about 0.05 up to about 20 weight % of aromatic monomer units comprising a mixture of the following structure randomly distributed therein:

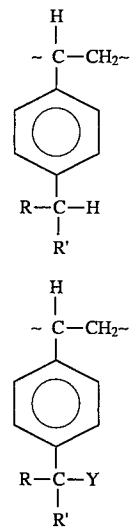

wherein R and R' are independently selected from the group consisting of hydrogen and $C_1$ to $C_4$ alkyl and Y is as defined above. Where all halogens present in the polymer are completely displaced, the resulting product is a terpolymer; where the halogens are only partially displaced, the resulting product is a tetrapolymer which would also include some unreacted halogen-containing monomer units as defined by monomer unit 2 above. The more preferred materials are terpolymers containing at least about 95 mole % of polymerized isobutylene and the balance a mixture of predominantly para-methylstyrene and less predominantly 4-(acryloyloxy-methyl)styrene, 4-(methacryloyloxy-methyl)styrene, 4-(cinnamoyloxy-methyl)styrene or 4-(2,4-hexadecanoyloxy-methyl)styrene.

The nucleophilic displacement reaction is preferably conducted under conditions and for a period of time such that at least about 25 wt %, more preferably at least about 50 wt %, and most preferably essentially all of the benzylic halogens are replaced by the Y ester group nucleophile. The resultant functionalized polymer will generally contain from about 0.01 up to about 10 mole % of the Y ester group, more preferably from about 0.05 to about 2.0 mole % of the Y ester group, and may also contain some residual, unreacted benzylic halogen.

Ester-functional elastomers which may be used as component (a) in the present invention also include ester-modified elastomeric terpolymers of ethylene/propylene and up to about 10 wt % non-conjugated diene (EPDM) such as dicyclopentadiene, 1,4-hexadiene, 5-methylene-2-norbornene and 5-ethylidene-2-norbornene. The ester functionalized derivative of these elastomers may be prepared by polymerizing ethylene, propylene and an alcohol, e.g., 5-norbornene-2-methanol, derivative of the non-conjugated diene under Zeigler-Natta polymerization conditions which give rise to alcohol functionalized derivative of the EPDM, as disclosed in U.S. Pat. No. 5,153,282, particularly Example 18, the complete disclosure of which patent is incorporated herein by reference. Conventional reaction of this product with the appropriate acid chloride yields modified EPDM polymers containing the Y ester groups as defined above attached to and pendant to the diene moiety of the polymer chain.

Graft curing of the ester functionalized elastomeric polymer is carried out by reaction with one or a mixture of free radically polymerizable monomers in the presence of a free radical initiator and for a period of time sufficient to convert substantially all of the monomeric material into graft and crosslinking polymer chains. The monomers may be chosen to give macro crosslinks of variable molecular weight. Simple graft cures wherein the macrocrosslink consists of polymer chains of monofunctional (monounsaturated) monomers can be generated utilizing suitable polymer-soluble or polymer-insoluble monomers. Interpenetrating networks can also be produced by inclusion in the polymerizable composition of small quantities of one or more polyfunctional (polyunsaturated) monomers in addition to the monofunctional monomers, which then generate an independent network that is interwoven with the graft cured network.

Useful monofunctional monomers include mono-olefinically unsaturated monomers such as styrene and substituted styrenes, alkyl acrylates and methacrylates, acrylic acid, methacrylic acid, acrylonitrile, methacrylonitrile, vinyl esters, vinyl ethers, acrylamide, methacrylamide, vinyl carbazole, vinyl chloride, vinyl acetate, vinyl pyridine, vinyl pyrrolidone, maleic acid or anhydride and mixtures thereof.

Suitable polyfunctional monomers which may be used in addition to the monofunctional monomers include dienes such as butadiene or isoprene, di- or trivinylbenzene, alkylene glycol di- or triacrylates or methacrylates and mixtures thereof. Preferred polyfunctional monomers include divinyl benzene, ethylene glycol dimethacrylate and 1,6-hexanediol dimethacrylate.

The selection of monomers, their concentration and optimum reaction conditions permit control of composition crosslink density, composite polarity, chemical and environmental behavior, mechanical properties, appearance (transparency-opacity), electrical conductivity and other useful and unique characteristics.

The curable composition is prepared by first forming a mixture of the ester-functionalized elastomeric polymer and one or more monomeric materials optionally with an added solvent for the elastomer. The term mixture as used herein refers to solutions formed by mixing polymer soluble monomers and polymer to form a swelled or liquid mass, or dispersions formed by mechanically mixing the polymer directly with polymer insoluble monomers or with a carder, e.g. silica or carbon black, on which such polymer insoluble monomers have been absorbed.

The curable composition may contain from about 1 to about 100 parts by weight of monomeric material per 100 parts by weight of said ester-functionalized elastomer, more preferably from about 10 to about 60 parts by weight of monomeric material. From 0 up to about 25% by weight of the monomeric composition may comprise one or more polyfunctional monomers.

The free radical sources which may be used to initiate crosslinking include irradiation, organic peroxides, organic hydroperoxides, azo compounds and inorganic redox free radical systems.

Irradiation sources include radiation such as gamma and beta radiation, ultra violet and visible light radiation, electron beam radiation or any other high energy radiation. Irradiation crosslinking may be effected by forming a mixture of the ester-modified polymer and crosslinking monomer(s), shaping said mixture and subjecting the shaped article to appropriate doses or radiation sufficient to crosslink the composition.

Chemical initiators which may be used include dialkyl and diacyl peroxides. The dialkyl peroxides have the general structure R—OO—R', where R and R' can be the same or different primary, secondary or tertiary alkyl, cycloalkyl, aralkyl, or heterocyclic radicals. Included in this group of peroxides which are suitable are dicumyl peroxide, di-t-butyl peroxide, t-butylcumyl peroxide and 2,5-dimethyl-2,5-bis(t-butyl peroxy)hexane.

Diacyl peroxides have the general structure RC(O)OO-C(O)R' where R and R' are the same or different alkyl, cycloalkyl, aralkyl, aryl or heterocyclic radicals. Illustrative of some diacyl peroxides suitable are dilauroyl peroxide, dibenzoyl peroxide, dicetyl peroxide, didecanoyl peroxide, di(2,4-dichlorobenzoyl)peroxide, diisononanoyl peroxide and 2-methylpentanoyl peroxide.

As will be evident to those skilled in the art, any organic peroxide which is useful in cross-linking polymers or initiating polymerization is encompassed in the present invention.

The basis for choice of peroxide for use in this invention include such things as the half life of the peroxide at the mixing and/or curing temperature and the compatibility of the selected peroxide in the system.

Examples of hydroperoxides which are suitable for use in the present invention include t-butyl hydroperoxide, cumyl hydroperoxide, 2,5-dimethyl-2,5 dihydroperoxyhexane, p-methane hydroperoxide and diisopropylbenzenehydroperoxide.

Examples of some azo compounds which are suitable for use as free radical initiators in this invention include diazoaminobenzene, N,N'-dichloroazodicarbonamide, azo dicarboxylic acid diethyl ester and azo bis(isobutyronitrile).

Where the crosslinkable composition contains a chemical initiator, it is generally mixed into the composition at a level of from about 0.1 to about 20 parts by weight per 100 parts by weight of the crosslinkable composition, more preferably from about 0.5 to about 5 parts by weight Crosslinking may be effected by forming a mixture of the ester-modified polymer, the crosslinking monomer(s) and the chemical initiator, shaping said mixture and heating the shaped article at a temperature in the range of from about 50° C. to about 250° C. for a period of from about 1 to about 120 minutes.

The composition may also contain one or more tertiary amines which promote decomposition of the organic peroxide. Preferred amines are those soluble in the curable mixture at curing temperatures. "Illustrative of such tertiary amines are triethylamine, tributylamine, and 2,4,6-tris(dimethylamino)phenol."

Metal carboxylates may also be used in this invention to accelerate decomposition of the peroxides to radical fragments. Illustrative of metal carboxylates suitable for use in this invention are the naphthenates, octoates and tallates of metals selected from the group consisting of aluminum, cobalt, vanadium, copper, calcium, lead, mercury, zinc, manganese, magnesium, zirconium and iron.

The composition of the invention may also contain suitable absorbents and fillers (both reinforcing and non-reinforcing) such as silica, carbon black, calcium carbonate, clays and other inorganic fillers, as well as synthetic and natural fibers. Such additives should be selected such that they do not interfere with or block the graft polymerization reaction.

The curable polymer compositions of the present invention may be used in a member of applications such as films, coatings and adhesives as well as in the fabrication of molded articles. Cured films exhibit excellent transparency which renders them particularly useful in optical applications such as automotive windshield construction. Compositions containing (meth) acrylic acids or acid esters and/or acrylonitrile grafting monomers may be used in the preparation of articles requiting increased oil resistance, e.g., gaskets and sealing strips, wire and cable insulation and like applications.

The following Examples are illustrative of the invention.

EXAMPLES

Example A

A methacryclic acid ester (MAE) derivative of an isobutylene/para-methylstyrene/para-bromomethystyrene base terpolymer was prepared as follows:

A 5000 mL glass-jacketed reaction vessel fitted with an overhead stirrer, a hose connector and a septum was purged with nitrogen. At room temperature under nitrogen, the vessel was charged with toluene (3100 mL) and 475 g of the base isobutylene/para-methylstyrene/para-bromomethylstyrene terpolymer comprising 2.4 mole percent total para-methylstyrene, including 1.05 mole percent para-bromomethylstyrene, and having a Mooney viscosity of 65 (1+8 min., 125° C.). The base terpolymer was dissolved by stirring at room temperature overnight. A tetrabutylammonium salt of methacrylic acid was prepared in a second flask by charging 123.6 mL tetrabutylammonium hydroxide (1.0M in methanol), 110 mmol methacrylic acid, 5.15 mmol 4-hydroxy-benzophenone and 100 mL isopropanol (IPA) to the flask and swirling the contents of the flask at room temperature, giving a water-white clear solution. This solution was then added to the flask containing the dissolved base terpolymer, at a circulating bath temperature of 83° C. After 45 minutes, the bath temperature was raised to 95° C. and let to run for 7.5 h. Then the bath temperature was lowered to 70° C., and after a 2.5 h period, the reaction was let to cool. The yellowish viscous solution was quenched and washed with 10 mL HCl in 1000 mL distilled water, and subsequently washed with $H_2O$/IPA (70:30) 5 to 6 times. The polymer was isolated by precipitation into isopropanol and dried in vacuo for 48 h at 1 mm Hg and 80° C. Solution viscosity of the recovered material was identical to the starting material, and $^1$HNMR (400 $MH_z$, $CDCl_3$) analysis of the functionalized polymer indicated quantitative conversion of the benzyl bromide. The results of NMR analysis show 0.35 mole % of methacrylate and 0.05 mol % benzophenone functionality in the polymer.

Example B

A second MAE derivative of the base terpolymer was prepared as described in Example A above except that the quantity of methacrylic acid included in the reaction medium was such as to produce a functionalized polymer containing 0.60 mole % of methacrylate ester.

Examples 1 and 2

The ester-modified isobutylene/para-methylstyrene polymers prepared in Examples A and B above were used to prepare graft crosslinked compositions in accordance with the invention.

To 10 grams of each of polymer A and B, 5 g of 99% styrene were added in a wide mouth 4 oz. jar. The jars were flushed gently with nitrogen and tightly capped. The styrene was absorbed by the elastomer to form a very viscous solution. The styrene/polymer solutions were transferred to a water cooled mini kneader (Baker-Perkins), mixed for 60 seconds, then 0.07 g of lauroyl peroxide (Aldrich-97%) was added to and mixed for 60 seconds. The mixtures were transferred to a 3 part mold with a 3"×3"×0.06" cavity and cured between teflon coated aluminum sheets. Curing conditions were 40 minutes at 105° C. at 1280 psi. The mold was twice bumped to remove occluded air. Upon completion of curing the samples were cut away from the cavity.

The composition and properties of the crosslinked compositions are shown in Table 1.

The data in Table 1 illustrate that the polystyrene chains are intimately bound into the crosslinked network in view of the fact that the percent extractables are low with both solvents, cyclohexane ($C_6H_{12}$) and methylethyl ketone (MEK). Cyclohexane is a solvent for the isobutylene/p-methylstyrene elastomer but not for polystyrene; MEK is a solvent for polystyrene but not for the elastomer. The insolubility of styrenic segments is evidence of grafting and irreversible crosslinking to the polymer backbone.

TABLE 1

| EXAMPLE | 1 | 2 |
|---|---|---|
| Polymer ID | A | B |
| MAE, mole % | 0.35 | 0.6 |
| ML (1 + 8) 125° C. Mooney Visc. | 51 | 47 |
| Color (original) | med. yellow | black-brown |
| Cured Conditions and Properties | (Cure 40'@ 105° C.) | (Cure 40' @ 105° C.) (tested after 96 hrs. @ RT) |
| Appearance | clear, colorless | clear, tan-yellow |

TABLE 1-continued

| Styrene odor | trace | trace |
|---|---|---|
| Tensil Properties (20'/min)* | | |
| # of specimens | 4 | 3 |
| 100% Mod., MPa | 4.822 | 2.545 |
| 200% Mod., MPa | 9.207 | 5.821 |
| 300% Mod., MPa | — | 10.370 |
| Tensile Strength, MPa | 10.370 | 11.25 |
| Elongation % | 218 | 317 |
| Energy to Break, Joules | 2.025 | 2.387 |

*ASTM D-412

| | Volume swell and extractables:[1] | | | |
|---|---|---|---|---|
| Solvent | $C_6H_{12}$ | MEK | $C_6H_{12}$ | MEK |
| Swell | 261 | 37.8 | 315 | 42 |
| Extractables, % | 0.50 | 0.47 | (−1.1) | 0.98 |

[1]After extracting for 72 hours at R.T. in the indicated solvents above, the same samples were then subsequently extracted in the alternate solvent after being weighed and dried to determine initial a% swell and extractables.

| Solvent | $C_6H_{12}$ | MEK | $C_6H_{12}$ | MEK |
|---|---|---|---|---|
| Swell | 269 | 39.6 | 349 | 42.8 |
| Extractables, % | 1.25 | 1.19 | 1.36 | 3.34 |

What is claimed is:

1. A curable polymer composition comprising a mixture of:

a) an elastomeric polymer containing from about 0.01 up to about 10 mole % of Y ester groups randomly distributed along and pendant to the elastomeric polymer chain, said Y ester groups having the structure:

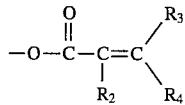

wherein $R_2$ and $R_3$ are independently selected from the group consisting of hydrogen and an alkyl group containing 1 to about 6 carbon atoms and $R_4$ is selected from the group consisting of hydrogen, an alkyl group containing from 1 to about 28 carbon atoms, an aryl group and an alkenyl group containing from 2 to about 28 carbon atoms; and b) at least one free radically polymerizable monomer.

2. The composition of claim 1 wherein said mixture further contains a free radical initiator.

3. The composition of claim 1 wherein said elastomeric polymer is a random interpolymer comprising at least about 80 weight % of polymerized isoolefin containing from 4 to 7 carbon atoms and from about 0.05 up to about 20 weight % of aromatic monomer units comprising a mixture of the following structure randomly distributed therein:

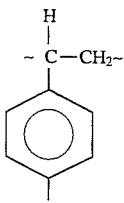

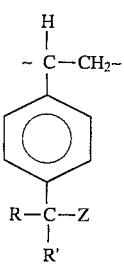

wherein R and R' are independently selected from the group consisting of hydrogen and $C_1$ to $C_4$ alkyl.

4. The composition of claim 3 wherein said $C_4$ to $C_7$ isoolefin is isobutylene and said copolymer contains at least about 90 weight % isobutylene and wherein R and R' are each hydrogen.

5. The composition of claim 4 wherein $R_2$ is methyl and $R_3$ and $R_4$ are each hydrogen.

6. The composition of claim 4 wherein $R_2$, $R_3$ and $R_4$ are each hydrogen.

7. The composition of claim 4 wherein $R_2$ and $R_3$ are each hydrogen and $R_4$ is $C_4$ alkenyl.

8. The composition of claim 1 containing from about 0.05 to about 2.0 mole % of said Y ester groups.

9. The composition of claim 3 wherein from about 5 up to about 60 mole % of said mixed aromatic monomer units have the structure (b).

10. The composition of claim 3 wherein said elastomeric interpolymer has a number average molecular weight in the range of from about 25,000 to about 1,000,000 and a compositional distribution (Mw/Mn) of less than about 7.

11. The composition of claim 1 wherein said free radically polymerizable monomer is present in said mixture at a level of from about 1 to 100 parts by weight per 100 parts by weight of said elastomeric copolymer.

12. The composition of claim 11 wherein said monomer comprises a monofunctional monomer selected from the group consisting of styrene and substituted styrene, alkyl acrylates and methacrylates, acrylic acid, methacrylic acid, acrylonitrile, methacrylonitrile, vinyl esters, vinylethers, acrylamide, methacrylamide, vinyl carbazole, vinyl chloride, vinyl acetate, vinyl pyridine, vinyl pyrrolidone, maleic acid or anhydride and mixtures thereof.

13. The composition of claim 12 wherein said monomer further comprises a polyfunctional monomer selected from the group consisting of butadiene, isoprene, di- or trivinyl benzene, alkylene glycol di- or triacrylates or methacrylates and mixtures thereof.

14. The composition of claim 12 wherein said mixture further contains a free radical initiator selected from the group consisting of organic peroxides and hydroperoxides.

15. A process for preparing a graft-cured polymer composition by forming a mixture comprising:

a) an elastomeric polymer containing from about 0.01 up to about 10 mole % of Y ester groups randomly distributed along and pendant to the elastomeric polymer chain, said Y ester groups having the structure:

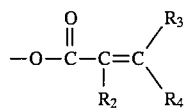

wherein $R_2$ and $R_3$ are independently selected from the group consisting of hydrogen and an alkyl group containing 1 to about 6 carbon atoms and $R_4$ is selected from the group consisting of hydrogen, an alkyl group containing from 1 to about 28 carbon atoms, an aryl group and an alkenyl group containing from 2 to about 28 carbon atoms; and b) at least one free radically polymerizable monomer, and subjecting said mixture to free radical polymerization conditions.

16. The process of claim 15 wherein said elastomeric polymer is a random interpolymer comprising at least about 80 weight % of polymerized isoolefin containing from 4 to 7 carbon atoms and from about 0.05 up to about 20 weight % of aromatic monomer units comprising a mixture of the following structure randomly distributed therein:

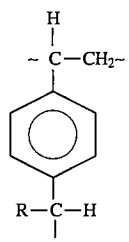

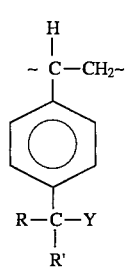

wherein R and R' are independently selected from the group consisting of hydrogen and $C_1$ to $C_4$ alkyl.

17. The process of claim 16 wherein said mixture further contains a free radical polymerization initiator.

18. The process of claim 17 wherein said mixture is formed into a shaped article and wherein said free radical polymerization conditions comprise the application of heat sufficient to crosslink said shaped article.

19. A polymer composition comprising the cured reaction product of a mixture comprising:

a) an elastomeric polymer containing from about 0.01 up to about 10 mole % of Y ester groups randomly distributed along and pendant to the elastomeric polymer chain, said Y ester groups having the structure:

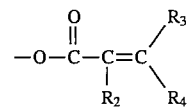

wherein $R_2$ and $R_3$ are independently selected from the group consisting of hydrogen and an alkyl group containing 1 to about 6 carbon atoms and $R_4$ is selected from the group consisting of hydrogen, an alkyl group containing from 1 to about 28 carbon atoms, an aryl group and an alkenyl group containing from 2 to about 28 carbon atoms; and b) at least one free radically polymerizable monomer.

20. The composition of claim 19 wherein said elastomeric polymer is a random interpolymer comprising at least about 80 weight % of polymerized isoolefin containing from 4 to 7 carbon atoms and from about 0.05 up to about 20 weight % of aromatic monomer units comprising a mixture of the following structure randomly distributed therein:

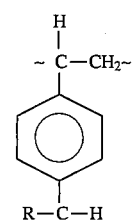 (a)

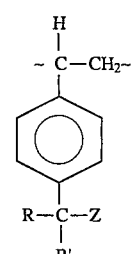 (b)

wherein R and R' are independently selected from the group consisting of hydrogen and $C_1$ to $C_4$ alkyl.

21. The composition of claim 20 wherein said mixture further contains a free radical initiator.

22. The composition of claim 20 wherein said $C_4$ to $C_7$ isoolefin is isobutylene and said copolymer contains at least about 90 weight % isobutylene and wherein R and R' are each hydrogen.

23. The composition of claim 22 wherein $R_2$ is methyl and $R_3$ and $R_4$ are each hydrogen.

24. The composition of claim 22 wherein $R_2$, $R_3$ and $R_4$ are each hydrogen.

25. The composition of claim 22 wherein $R_2$ and $R_3$ are each hydrogen and $R_4$ is $C_4$ alkenyl.

26. The composition of claim 20 containing from about 0.05 to about 2.0 mole % of said Y ester groups.

27. The composition of claim 20 wherein from about 5 up to about 60 mole % of said mixed aromatic monomer units have the structure (b).

28. The composition of claim 20 wherein said elastomeric interpolymer has a number average molecular weight in the range of from about 25,000 to about 1,000,000 and a compositional distribution (Mw/Mn) of less than about 7.

29. The composition of claim 20 wherein said free radically polymerizable monomer is present in said mixture at a level of from about 1 to 100 parts by weight per 100 parts by weight of said elastomeric copolymer.

30. The composition of claim 29 wherein said monomer comprises a monofunctional monomer selected from the group consisting of styrene and substituted styrene, alkyl acrylates and methacrylates, acrylic acid, methacrylic acid, acrylonitrile, methacrylonitrile, vinyl esters, vinylethers, acrylamide, methacrylamide, vinyl carbazole, vinyl chloride, vinyl acetate, vinyl pyridine, vinyl pyrrolidone, maleic acid or anhydride and mixtures thereof.

31. The composition of claim 29 wherein said monomer further comprises a polyfunctional monomer selected from the group consisting of butadiene, isoprene, di- or trivinyl benzene, alkylene glycol di- or triacrylates or methacrylates and mixtures thereof.

32. The composition of claim 20 wherein said mixture further contains a free radical initiator selected from the group consisting of organic peroxides and hydroperoxides.

33. The composition of claim 20 wherein said cured reaction product is prepared by subjecting said mixture to free radical polymerization conditions.

* * * * *